United States Patent Office 3,344,276
Patented Sept. 26, 1967

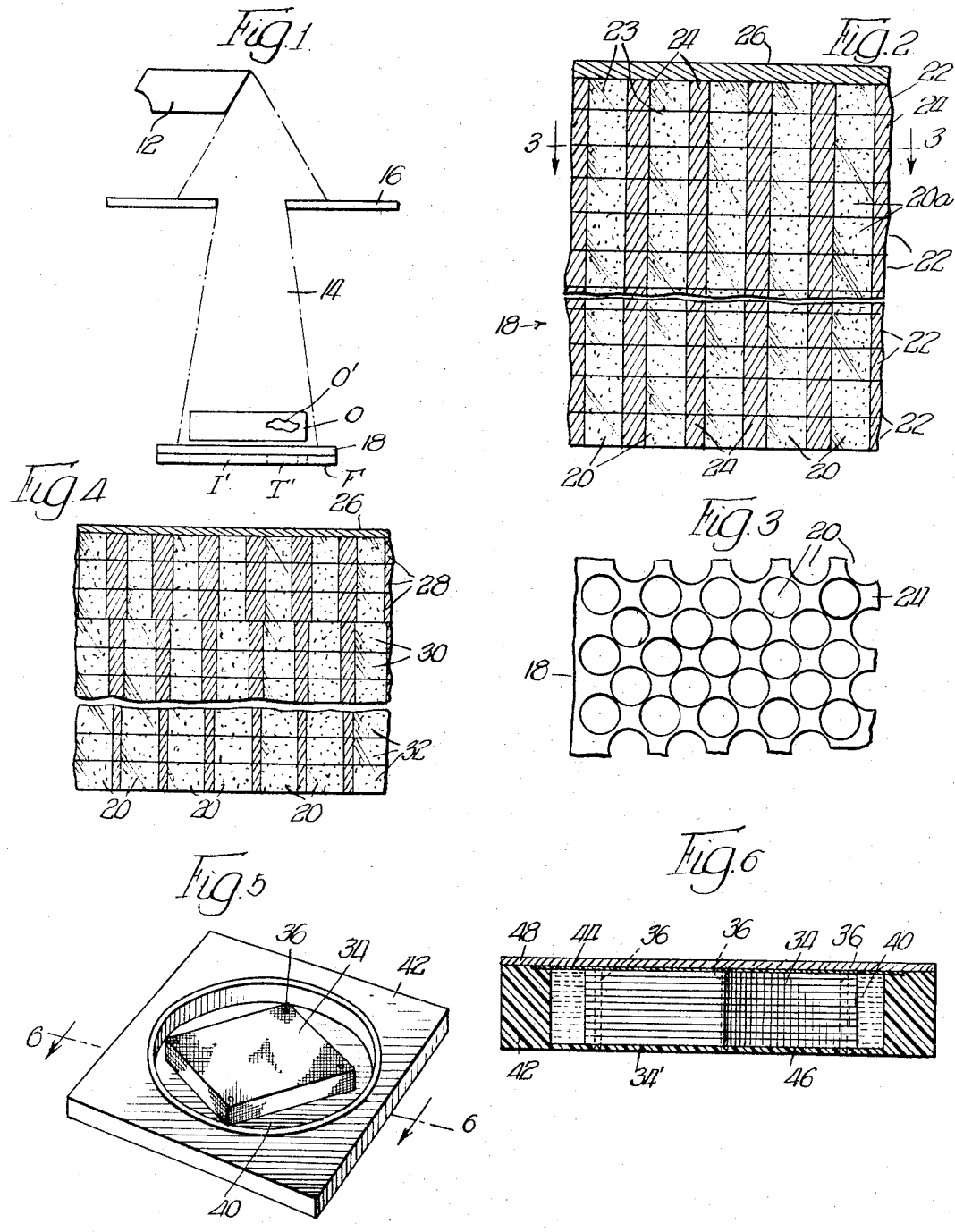

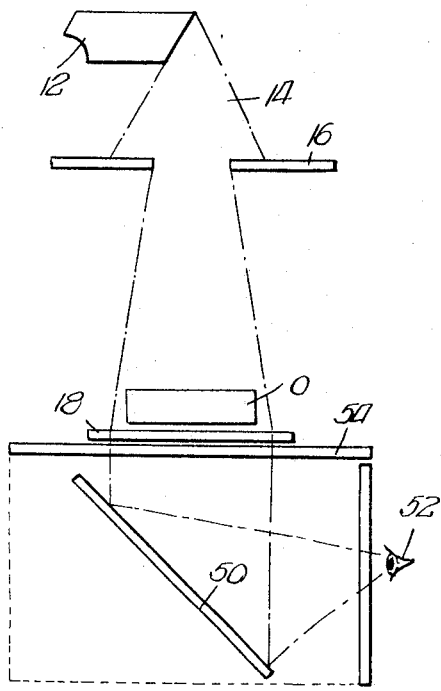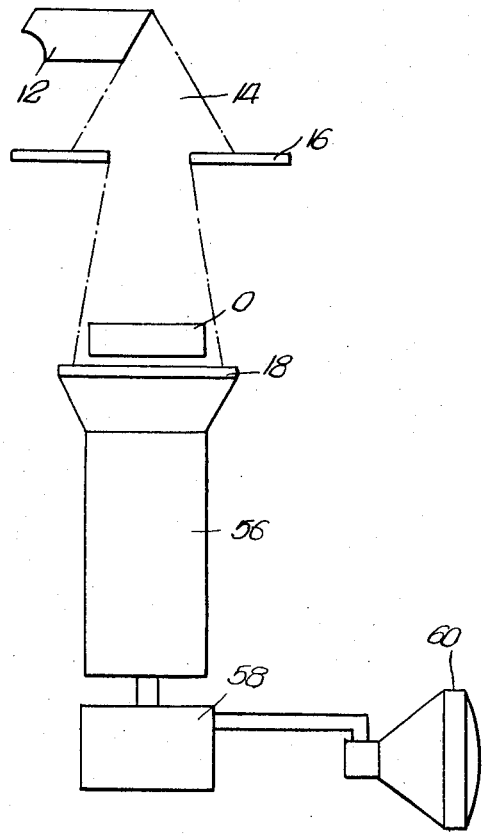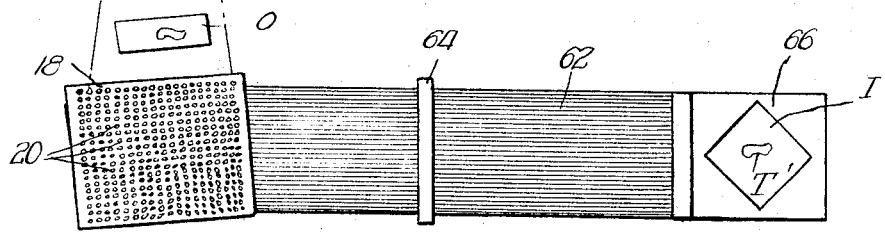

3,344,276
RADIOGRAPHIC SCREEN HAVING CHANNELS FILLED WITH A MATERIAL WHICH EMITS PHOTONS WHEN ENERGIZED BY GAMMA OR X-RAYS
George H. Balding, Fremont, Calif., assignor to Kaiser Aerospace & Electronics Corp., Palo Alto, Calif., a corporation of Nevada
Filed Mar. 30, 1964, Ser. No. 355,664
13 Claims. (Cl. 250—80)

This invention relates to radiographic screens useful in detecting radiated energy waves as in X-ray and gamma ray radiography.

Since the conception and first use of X-ray machines, industry has found X-rays and gamma rays to be a useful tool with which to examine the internal components of machines and the quality of various objects. This is because the gamma and X-rays are directional, that is, they proceed in straight lines from their emanating source and, unlike rays of longer wave length, they are only negligibly refracted and pass through all materials, although at different rates in accordance with the nature of the material, its density and its thickness. The thicker the material the greater the proportion of the rays that are absorbed and/or retarded. For example, the presence of flaws such as gas bubbles or striations interiorly of a steel casting or other object may be detected by positioning the object between a source of radiation and a film sensitive to the radiations. The gas bubble effectively reduces the thickness of the object and so allows more of the X-ray and gamma radiations to pass through than will other solid sections of the object. The film therefore is differentially exposed in accordance with the proportion of the rays which the object permits passage, and on development of the film a dark spot will appear corresponding to the flaw in the object. Also, if a fluorescent screen is substituted for the light sensitive film, the fluorescent composition of the screen converts the X-ray and gamma rays impinging thereon to visible radiations which form an image which can be viewed under particular circumstances. An example in the prior art of the latter is the so-called fluoroscope.

The amount of X-ray or gamma rays which will pass through an object of any substantial thickness is, however, small and in an effort to shorten the exposure time it has been customary to employ an intensifying screen between the object and the film. Where the energy level of the rays was less than 1 mev., these screens usually have consisted either of thin lead foils or a thickness of fluorescent material such as calcium tungstate or barium lead sulphate. Conventionally, a pair of such screens have been employed, one on each of the two surfaces of the film, to further intensify the image, and close contact is maintained between the screens and film surfaces to avoid fuzziness of the image. Even so, the arrangements are not wholly satisfactory. The fluorescent material of the latter type screens converts the energy of the X-rays to visible radiations or photons to which the film has greater sensitivity. However, the photons emitted by the energized fluorescent particles are multi-directional. They overlap and spread to adjacent particles of the screen on all sides and so that the outline of the image is blurred and difficult to read. The lead foils operate as an intensifier by reason of their ability to emit secondary electrons under the excitation of the gamma rays and X-rays. Again, however, the secondary electron emission effect of the lead foils like the lighting effect of the cadmium sulphide scatters in all directions and, accordingly, clarity and sharpness of image as well as contrast suffers. The lead foils also have a much too low intensification factor.

It also has been proposed to speed up the photographic process by turning to the harder gamma and X-rays. However, when the energy level of the generated rays exceeds 1 mev., other problems appear. Presently available films are essentially insensitive to these harder rays. The aforementioned fluorescent material and lead foil screens become transparent to the higher energy X-rays and gamma rays and the fluorescent material is not able to absorb the radiations and convert them to light.

It has been proposed to increase the thickness of the lead and calcium tungstate or barium lead sulphate screens so that the beams of higher energy X-rays would lose most of their energy in penetrating the detecting material comprising the screen. However, with thickening of the calcium tungstate or barium lead sulphate, it becomes opaque to its own light. Increasing the thickness of the lead, on the other hand, only increases the secondary effect and so also lowers definition. It also has been proposed to produce large volume scintillation detectors comprising hundreds of gallons of liquid phosphors. Such have proved useful in detecting the high energy radiations but are less than satisfactory for photographic purposes. When a portion of the detector is excited by the radiations it emits photons to which the film is sensitive. However, the emitted photons excite adjacent portions which also light up and so the light spreads by photon multiplication until the whole detector screen is illuminated and image contrast is lost.

Therefore, a first and principal object of the present invention is to provide a means and method of trapping radiating energy waves such as the high energy gamma and X-rays so as to convert them into photon energy and which will collimate or channel the photons in parallel paths so that they will be useful to produce an image for viewing or exposing on film which will have good image resolution and sharpness of contrast.

Still another object of the invention is to provide means and method of effectively producing small angle pinhole cameras for low energy gamma ray photography by collimating the rays through finely isolated channels or ports and used to expose film or to produce an image for direct viewing or by means of a camera.

Another object and/or feature of the invention is to provide a radiographic screen for X-ray and gamma ray inspection devices which converts the impinging primary radiations to photons and effectively channels and/or collimates the photons through the screen while inhibiting photon coupling with adjacent areas of the screen which would confuse and/or give a false imagery.

A corollary object and/or feature of the invention is to provide such a radiographic screen which is particularly useful where the employed gamma and X-rays are at energy levels higher than 1 mev.

Still another object of the present invention is to improve upon prior art radiographic screens so as to permit the production of an image of good clarity, contrast and sharpness to be formed when employing either soft or hard X- or gamma rays over 1 mev.

A further object and/or feature of the invention is to provide a radiographic screen which will be impervious to secondary radiations emitted by the object through which the gamma or X-rays are passed so that the clarity, sharpness and contrast of the produced image will be unaffected by such secondary radiation.

Still another feature and/or object of the invention is to provide an X-ray and/or gamma ray radiographic screen which is receptive substantially only to the primary radiations of said high energy level and which converts said radiations to photons which it directs axially of the beam and so intensifies as to assure clarity and sharpness of the image with good contrast and high resolution.

A further object of the present invention is to provide such an X-ray and gamma ray radiographic screen which is sufficiently efficient in its operation that it can be used alone between the object and the film without the necessity of a second or back intensifying screen.

Still another object and/or feature of the invention is to provide a radiographic screen which converts high energy X-ray and gamma radiations to photons and of sufficient intensity that an image is produced having such clarity and sharpness of image as well as contrast and resolution that it can be easily discerned and readily viewed.

Another object and/or feature of the invention is to provide an X-ray and/or gamma ray intensifying or radiographic screen of the character described which is also of simple and sturdy construction, as well as one capable of highly efficient and effective operation.

Many other objects, features and/or advantages of the invention will be at once apparent, or will become apparent, from the following description of preferred forms of the invention which are illustrated by the drawings.

Referring therefore to the several views comprising the drawing:

FIGURE 1 is a schematic view illustrating use of the invention;

FIGURE 2 is an enlarged fragmentary view taken through a section of a radiographic screen comprising one embodiment of the invention;

FIGURE 3 is a fragmented sectional view taken along lines 3—3 in FIGURE 2 looking in the direction indicated by the arrows, and illustrates the preferred shape of the collimating channels comprising the radiographic screen;

FIGURE 4 is a view generally similar to FIGURE 2 but somewhat fragmented, and illustrates an alternate construction of radiographic screen in accordance with the invention;

FIGURE 5 is a top perspective view illustrating a construction of radiographic screen in accordance with the invention wherein the scintillating material is in a gaseous or liquid state;

FIGURE 6 is a sectional view taken through the screen illustrated by FIGURE 5 and along lines 6—6 therein looking in the direction indicated by the arrows;

FIGURE 7 illustrates use of the radiographic screen in a viewer employing a mirror;

FIGURE 8 schematically illustrates the radiographic screen being scanned by an image orthicon pickup tube for transmitting to a remotely located television viewing tube or kinescope for viewing on the screen thereof; and FIGURE 9 schematically illustrates fiber optics employed to permit direction of the radiographic image from the radiographic screen for viewing in a remotely located screen.

At 12 in FIGURE 1 is represented the anode of an X-ray producing tube or gamma ray source, from which a narrow beam of radiations 14 are focused by means of diaphragm 16 through an object O to be inspected, said object having a flaw O'. The portion of said radiations passing through the object are converted in radiographic screen 18 to photons and which are collimated by the screen to expose an image I on light sensitive film F which when developed will include a dark spot at I' corresponding to the flaw O' in the object O. Although object O is shown spaced from screen 18, this is for convenience of illustration, and preferably in keeping with known practices and techniques it is located as close to screen 18 as is practical so as to minimize secondary radiations. Film F is also located in close intimate contact with the exit or rear side of screen 18 in order to minimize image loss through light dispersion.

In accordance with the invention, screen 18 comprises a plurality of isolated although closely-spaced openings or channels 20 of uniform size and shape, uniformly distributed through the entire area of the screen. These extend axially in a direction considered normal to the opposed surfaces thereof and so as to be parallel with the axis of the gamma or X-ray beam 14 when properly positioned in said beam with the object O therebetween and the anode 12. The screen itself is fabricated of an opaque metal such as copper or stainless steel, which is characterized by low or minimum secondary electron emission and is impervious to the passage of photons.

In FIGURES 2 and 3 of the drawing a specific embodiment of a radiographic screen constructed according to the invention is seen to comprise several micromesh screens or sheets 22 each containing a multiplicity of closely packed apertures 20a roughly of a width greater than their thickness and which are aligned to constitute the aformentioned channels 20 and are separated by webs 24. Channels 20 are filled with an appropriate scintillating material which is photon emissive when excited by high energy X-rays or gamma rays of 1 mev. and higher. Such scintillators may exist in liquid, gas or solid form, but for convenience in manufacture as hereinafter more particularly described, preferably comprises a transparent plastic, as for example, polystyrene or polyvinyltoluene containing a phosphor such as ground anthracene uniformly mixed therethrough. The plastic may also be loaded with particles of lead, barium lead sulphate or other secondary emission generators which will increase the light output of the scintillators.

My radiographic screen therefore in effect comprises a multiplicity of regularly spaced elongated scintillators 23 which are sufficiently fine in cross-section and so closely packed that the individual scintillators are not readily discerned by the viewer. They are so closely packed that the screen has an areal transmission of better than 70% and preferably in the order of 80% so that the image I produced on the film F is of high resolution and definition. At the same time each scintillator is entirely isolated from each of the other scintillators by the intervening webs 24 so that the photons emitted by one scintillator do not spread to adjacent scintillators to confuse the transmitted image. Each scintillator is therefore excited only by the entering high energy X-rays and gamma rays which have passed through object O. The high energy level X-ray and gamma rays employed also pass through the isolating webs 24. However, I have found that there is little or no secondary emission on the part of the copper or stainless steel material of which said webs are preferably formed and neither is the film itself affected by these high energy rays. Furthermore, a thickness $t$ is selected for the screen so that the radiations are largely retarded and therefore excite the phosphor content of the channels 20 to emit the photons to which the film F is sensitive. As previously pointed out, diaphragm 16 is so regulated that the beam of rays 14 from anode 12 are confined within a narrow angle and with the result that radiations entering the scintillators do so nearly parallel to their axis and so that there is a minimum of cutting across the adjacent channels. At the same time the width $w$ of said scintillators comprised in channels 20 are so small in cross-section and their length $t$ so great that the primary radiations which strike their entrant end parallel or nearly so, to the axis thereof, are retarded and sufficiently absorbed that the phosphor content of the scintillators are excited to emit photons which in turn are collimated by the channels 20 so as to be directed in straight lines also paralleling the axis of the beam 14 and exit through the opposite end of the screen 18 to expose film F or form an image to be viewed as hereinafter described.

As previously stated, resolution and definition of the image produced by the radiograph screen 18 is a function of the cross-section of the channels and their spacing. For this purpose, I have found that the channels should have a cross-section of the order of .007 to .030 inch, that is so that they are not readily individually resolved to the naked eye. For maximum resolution and definition of the image, the holes are also preferably staggered in approximately a 60° array or at least so closely packed as to give at least a 70% transmission factor and preferably to comprise 75–80% of the total screen area. For this purpose, I dimension the webs so as to comprise .003 inch measuring between centers of adjacent openings. For example, a screen having channels of .030 inch diameter will be arrayed so that their centers are spaced .033 inch. In the case of .007 inch diameter channels their centers will be spaced .010 inch. The thickness of the screens and therefore the length of the channels 20 is selected in accordance with the energy level of the gamma rays employed. For example, where the rays are generated at a level of 15–20 mev., I have found that the screens should be about ³⁄₁₆ inch thick. Screens of ½ inch thickness have been constructed with .030 inch size openings and .033 inch center to center spacing which showed good light output and resolution of image where the X-ray beams were generated up to 25 mev. energy levels, whereas screens ¼ inch thick have been constructed with .007 inch diameter openings and .010 inch spacings which provided good light output and image resolution where rays at energy levels up to 20 mev. were employed.

Screens having the required small cross-section and close packing can be satisfactorily produced by a chemical etching process. However, the sheets are much too thin to provide the desired retardation of the high energy level gamma and X-ray beam. For example, a micromesh stainless steel or copper screen having apertures .030 inch in diameter with center-to-center spacing in the order of about .033 inch can be produced and are available in thicknesses of about .005 inch. Such screens are produced by dipping a piece of copper sheeting, for example, of about .005 inch thickness into a photo-resist solution as, for example, Kodak KPR which is commercially available. On removal from the bath the sheet is air-dried and negatives of the desired pattern are aligned on the top and bottom sides of the coated copper sheet. The two sides of the coated sheet are then exposed through the negatives to ultra-violet light for approximately 2–3 minutes, depending on the sensitivity of the photo-resist coating. Before exposing the assembly to the ultra-violet light, preferably the assembly is placed in a vacuum tray to assure obtaining a tight contact and intimate seal between the negative and surfaces of the copper sheet on which they have been located. The exposed copper sheet is then placed in a bath of an appropriate water miscible organic solvent which will remove that part of the resist coating not exposed to the ultra-violet light. One such solution is available commercially under the name "Metex Resist Remover M–682." After washing in water and air-drying, the copper sheet is dipped in a ferric chloride solution for a time sufficient to etch away that portion of the copper not protected by the ultra-violet exposed coating, after which the sheet is again rinsed in water and air-dried. A similar process may be employed to produce micromesh screens from stainless steel sheeting and also to produce micro screen having smaller sized openings. It will be appreciated that as the land area between the holes is reduced as when it may be desired to more closely relate the holes to increase the transmission factor, one must also start with proportionately thinner sheets. Even so, by stacking the necessary number of such treated sheets 22 (FIGURE 2), then aligning the openings 20a thereof and spot-welding the assembly at a number of points about their periphery, a screen 18 of any desired thickness can be readily formed.

For maximum light output of the scintillators 23 comprising the several channels 20, it is a feature of the invention that the inner walls of the channels be highly reflective to the photons. Where layers 22 comprise copper mesh, the mesh should be silverplated to increase the reflectivity of the channel walls. The actual thickness of the silver plate is not important although it should be kept small, and a thickness of perhaps .0002 inch will suffice in most instances. The silverplating decreases the absorption of light by the walls of the opening 20a through the copper mesh 22 and increases the light output by a large factor. If the mesh layers 22 are of a material such as stainless steel which is inherently of a highly reflective nature, the silverplating may be omitted. The top or entrant side of screen 18 is also covered by a thin layer 26 of aluminum or other opaque highly reflective material which will permit the primary gamma and X-rays to pass through so as to excite the phosphor content of said scintillators, and will also act as a reflector to assist the reflective character of the channel walls to concentrate, direct and thereby intensify the emitted photons outwardly through the opposite end of the channels and onto the sensitized film F or to form an illuminated image to be viewed. In place of aluminum, other materials, for example, magnesium oxide, which will reflect the photons toward the film or viewing side of the screen 18 while permitting passage of the primary gamma and X-rays of shorter wave length may also comprise layer 26. Aluminum layer 26 may comprise either a thin foil, perhaps .001 inch thick, or it may be electrolytically applied, and therefore much thinner, in the order of .00025 inch. Actually the thickness of layer 26 is not material as long as it is continuous in nature and is able to reflect the emitted photons while being transparent to the X-ray and gamma rays at the elected energy level.

In FIGURES 2 and 3 channels 20 have been illustrated as having a cylindrical shape. However, the light output of the scintillators can be further increased if channels 20 and therefore the individual scintillators are afforded a more nearly conical shape. Such an intensifying screen is illustrated by FIGURE 4. Referring to said figure the top group of foraminous layers 28 may be considered to comprise silverplated copper or stainless steel micromesh having a thickness of .0057 inch, their apertures being .001 inch in diameter, and the center-to-center spacing of the apertures being .010 inch. The next three layers 30 are also micromesh screens .0057 inch thick, but have slightly larger diametered apertures and with correspondingly narrower intervening webs. Succeeding layers 32 are also micromesh screens of the same thickness but have still larger diametered apertures with correspondingly smaller intervening webs. For example, their apertures may be .007 inch in diameter and correspond to micromesh screen layers 22 of the FIGURE 2 embodiment. It will be apparent that by selection of micromesh screens having regularly increasing aperture sizes and decreasing webs, the screens can be assembled and with their apertures aligned to readily and conveniently obtain the required conical shape. If a more sharp or exact cone shape is required, then each layer can be selected to have an aperture size greater than the screen layer immediately above it.

In fabricating a radiographic screen according to the invention, I prefer to use either stainless steel or silverplated copper micromesh sheets 22, as previously described. However, sheets of other suitable material may also be employed. The openings through the sheets 22 are preferably smaller than .030 inch, .007 inch being preferred, and the holes are preferably arranged in a 60° array so as to give an approximately 70–80% transmission factor. For example, if the holes are .007 inch in diameter, they should be arranged with a center-to-center spacing of .010 inch. As previously indicated, such mesh sheets are available in thicknesses of approximately .005 inch. These can be cut into rectangles of desired size and a number thereof stacked together depending on the thickness of radiographic screen desired. In stacking micromesh with .030 inch holes and .033 inch center-to-center spacing, alignment of the apertures is easily achieved by using a small pin to initially align one group of apertures in the superimposed screens, and then moving the screens individually about the pin until all the other apertures are similarly aligned. In cutting and stacking the screens, attention should be directed to keeping the screens free of grease, lint or dust which might contaminate the potting material. After the screens are stacked and secured together they should be kept in a dust-free enclosure until required. Stainless steel screens are possibly easier to stack than copper mesh screens because of their greater strength. In stacking screens with the smaller sized openings, for example, .007 inch, a small wire is usually placed through one corner of all of the screens and then one at a time the screens are overlapped, while looking through them until a small circle of vision can be seen through the screen at which time another wire is placed through the diagonally opposite corner. The screens are aligned one at a time in this manner and finally wires are threaded through each of the four corners of the assembly to complete the alignment.

When thus stacked, with their apertures properly aligned, the assembly is ready for potting with a suitable monomer-fluor mix containing an appropriate catalyst and thereafter to be polymerized with heat and pressure. This is obtained by lowering the assembly into a glass container of the monomer-fluor mix which contains enough of the potting materials so as to cover the top of the screen when disposed on its side therein. However, before placing the assembly into the container, the container and its monomer-fluor mix is placed in a vacuum system to remove air bubbles which were mixed into the material. After approximately 20 minutes, it will be found that all of the bubbles will have been removed. The container is then removed from the vacuum and a piece of glass having four small holes drilled to match the drills which are used to align the screens is carefully placed into the container and the container is again placed in the vacuum system to remove any bubbles. The screen is next placed into the monomer-fluor mix and air bubbles are allowed to rise out of the screen. Again, the container is placed into the vacuum; however, the vacuum is not lowered to the maximum at this time because the silverplated copper tends to outgas continuously. However, by careful attention to the pressure being developed, a point will be found where air can be removed and outgassing of the screen material is not a problem. If the screen is of stainless steel, I have found that there is no outgassing problem, and the assembly is therefore easier to evacuate. The evacuation process may require as much as one hour's time in order to achieve the complete removal of bubbles. The container is then removed from the vacuum system, the screen is turned on its side and two further drills are driven through the other two corners to complete the alignment of the screen, after which glass tubes are inserted through holes in a piece of cardboard, placed over the top of the container and over the protruding ends of the four aligning drills. A sheet of ¼ inch rubber is then placed over the top of the glass tube and a weight placed on top so as to hold the screen together. The weight should be sufficient to compress the screens so that there are no gaps, but without so much weight as to cause bubbles to form in the channels through the screen.

The scintillator of choice comprises a transparent plastic, such as polystyrene or polyvinyltoluene, containing a phosphor which is sensitive to the high energy level X-ray and gamma rays. One such material that I have used is commercially available under the name "NE 102 Plastic Phosphor" and is described by its manufacturers, Nuclear Enterprises Ltd., Winnepeg, Canada, as having the following characteristics:

| | |
|---|---|
| Density | 1.03. |
| Refractive index | 1.58. |
| Softening point | 75° C. |
| Light output | 65%. |
| Wavelength of maximum emission | 4,240 AU. |
| Coefficient of cubical expansion below T. | $2.34 \times 10^{-4}$. |
| (Transition temp. (T.) 67° C.) Above T. | $6.58 \times 10^{-4}$. |

Its atomic composition is described as:

| | Atoms/cc. |
|---|---|
| H | $5.25 \times 10^{22}$ |
| C | $4.75 \times 10^{22}$ |
| N | $1.8 \times 10^{18}$ |
| O | $1.8 \times 10^{18}$ |

No. of electrons per cc.—$3.4 \times 10^{23}$.

Its decay constants are described by K. Penckert in "Nuclear Instr. and Methods," vol. 17, No. 3, p. 257, December 1962, as follows:

| | Decay Time | | Rel. Max. Amplitude | |
|---|---|---|---|---|
| | Electrons | Protons | Electrons | Protons |
| First Component | $4.2 \times 10^{-9}$ sec. | $3.7 \times 10^{-9}$ sec. | 100 | 100 |
| Second Component | $62 \times 10^{-9}$ sec. | $48 \times 10^{-9}$ sec. | 4.2 | 6.3 |

The container with the assembly when ready is placed in a water bath at 47° C. and retained in an oven maintained at 47° C. for three days until the monomer-fluor mix is sufficiently polymerized that the mix does not yield to a sharp object pressed into it. The oven temperature is then raised to 80° and held for eight hours, after which the oven is turned off and the plastic allowed to decrease slowly in temperature over a period of several days after which the plastic assembly is removed by breaking the glass container. The excess polymerized plastic about the screen assembly is then removed as by sawing and grinding, after which the lower glass plate is removed by breaking. While protecting the lower side of the assembly with tape, the top surface is then ground to leave as thin a layer of plastic as possible without striking the screen surface proper. To permit maximum light transmission through the radiographic screen, its exterior plastic surfaces should be as smooth and free of scratches as possible. For this purpose, the top surface may be then further polished with No. 400 wet emery paper or with "CH41" 3M crocus cloth. This may be done either wet or dry, although wet seems to give a slightly smoother surface. After the screen surface has been polished as smooth as possible, the screen surface is lowered into a container of ethylene dichloride for 15 seconds, then turned on its side and allowed to dry in its up position. The surface may also be polished by saturating a soft paper towel with ethylene dichloride and wiping. Further polishing can also be done by flame polishing technique.

Where the screens are constructed of micromesh comprising the smaller .007 inch holes, the method of evacuation is slightly changed because of the use of alignment wires to hold the individual screens in aligned relation. In this case the separated screens are lowered into the polymer-fluor mix and after evacuation as before, the screens and glass are turned so that the glass plate lies at the bottom of the container. The wires are then pulled tight by means of a pair of long-nosed pliers and the screen and glass tied together. The plastic is then cured and polished as before.

Examples of other useful monomer-fluor solutions and their polymerization technique may be had by reference to the article by Warren L. Buck and Robert K. Schwank, at page 48 in the November 1953 issue of "Nucleonics, vol. XI, No. 11." The scintillating material may also comprise a gas such as helium, xenon or argon, or it may be a liquid. For example, a suitable liqiud scintillator would comprise 2,5-diphenyloxazole and p-bis[2-(5-phenyloxazolyl)]-benzene in toluene, the former being present in the approximate ratios of 100 grams and the second in the ratio of 1.25 grams per liter of toluene.

Referring to FIGURES 5 and 6, a liquid scintillator is formed by supporting an assembly of aligned silverplated copper or stainless steel micromesh sheets 34 on pins 36 within the hollow 40 of a transparent plastic block 42. Conveniently, block 42 is cast to the indicated shape with the first micomesh sheet 34' embedded in the floor thereof and with pins fixed in the four corners of the embedded sheet 34'. The hollow 40 is then filled with a suitable liquid scintillator which penetrates through the channels of the aligned micromesh sheets 34, and the block 42 placed in a vacuum system in order to remove bubbles. Thereafter the top of the micromesh assembly is covered by an aluminum foil layer 44 and the hollow enclosed by a cover 48 of similar transparent plastic which is fused to the periphery of block 42 under heat and pressure. Aluminum layer 44 corresponds in function and structure to layer 26 in the embodiments of FIGURE 2. Usefully, floor 46 of the hollow 40 in block 42 and which constitutes the film, or viewing side of the finished screen, will be as thin as is practicable so that the bottom layer of the micromesh screen, the openings of which are embedded with the plastic of block 42, will contact the film to avoid light dispersion.

Conceivably channels 20 in the embodiments of the invention according to FIGURES 2 and 4 can also be filled with an opaque material such as lead which emits secondary electrons as when the screen is to be used in a machine employing X-ray and gamma rays of lower energy values. In this connection it will be recognized that at lower energy levels, as for example, in the region of 100 to 200 kev., the channels 20 of the screen 18 will collimate the entering X-rays themselves so that there will be a cumulative effect on the film comprising the collimated X-rays and the photons emitted by the excited fluorescent material with which the channels are loaded, and which is capable of being excited by said lower energy level radiations. It will, however, be appreciated that where the radiations employed are greater than 1 mev., then the channels 20 do not collimate the X-rays, but only the energized light or photons which are emitted by the excited fluor content of the channels.

Instead of locating film F at the exit side of radiographic screen 18, the illuminated image produced by the excitation of the scintillators in channel 20 of the screen may be viewed directly or by means of a mirror 50 (FIGURE 7), the viewer being located at 52. In such arrangements, as a safety precaution a lead glass plage 54 may be located between the mirror 46 and the radiographic screen 18 to safeguard against any gamma or X-rays which penetrate screen 18.

Also as illustrated in FIGURE 8, the screens may be located on or actually comprise the face of an image orthicon or other image pickup television tube 56 which scans the image being formed on the exit side of radiographic screen 18 (FIGURE 8), the received image being amplified at 58 and transmitted to a kinescope 60 or other image receiving station for viewing at a remote location. Where the radiographic screen comprises an integral part of the image pick-up tube, if the screen employs a liquid phosphor as in embodiment of FIGURES 5 and 6, with deterioration of the phosphor after long use, it may be conveniently revitalized by substituting fresh liquid phosphor.

Also, as illustrated in FIGURE 9, fiber optics may be employed to receive the image formed by radiographic screen 18 and direct it to a remotely positioned viewing station. In said FIGURE 9, 62 represents bundles of fiber optics the one ends of which are shown aligned with the exit ends of channels 20 in radiographic screen 18, the bundles being supported at appropriately spaced locations by support 64, and their other ends forming an image viewing screen 66. An advantage of this arrangement, as well as that illustrated by FIGURE 8, is of course that it permits location of the viewer to one side of the X-ray or gamma ray beam 14 and also at a distance considerably remote from the X-ray device as, for example, in an adjacent room. The construction of fiber optics employed in FIGURE 9 as well as the components of the television scanning and receiving system of FIGURE 8 are of course well known and of themselves form no part of the present invention except as used in conjunction with my described radiographic screen.

Although radiographic screens comprising the invention have thus far been described as used in detecting X-ray and gamma rays, it will be understood that the invention has broader application and by selecting the appropriate phosphor or secondary emitter will be responsive to other radiated energy waves, so as to produce secondary emissions which channels 20 can collimate to produce an image which can be sensed as by a cathode ray tube or which is visible to the eye.

For example, the scintillators comprising channels 20 may contain particles of cadmium sulphide which change resistance values or zinc sulphide which will emit photons when energized by infra red rays. In the latter instances the photons will be collimated by channels 20 so that they may be sensed by any of the arrangements comprising FIGURES 1, 7, 8 or 9.

Therefore, as described, it is apparent that all of the recited objects, advantages and/or features of the invention have been shown as obtainable in a completely practical, highly efficient and entirely effective manner.

Furthermore, it will be understood that many other changes, substitutions and rearrangements may be made in the radiographic screens comprising my invention and without departing from the spirit and scope of the accompanying claims. Accordingly it is intended and understood that all matter contained in the foregoing description and shown in the accompanying drawings is to be interpreted as illustrative of my invention and not in a limiting sense.

I claim:

1. A radiographic screen comprising a plurality of superposed contiguously related opaque metal layers each having a multiplicity of closely arrayed uniformly arranged openings chemically etched through the thickness thereof, which openings are of a uniform width greater than the thickness of the individual layers and less than .030 inch, the openings through said layers being aligned with openings in other of said layers to constitute long and narrow channels extending axially of the screen from front to rear and filled with material which emits photons when energized by gamma and X-rays of high energy level, the length of said channels being sufficiently longer than the width of said opening so as to retard those high energy level gamma and X-rays passing axially into said channels and causing said material therein to emit photons, the walls of said channels being reflective to said emitted photons and the entrant side of said screen including said filled channels being covered by a continuous layer of material which transmits the said gamma and X-rays and is reflective to said emitted photons whereby the emitted photons are directed to the exit ends of the channels, the portions of the sheet between the openings constituting said channels being narrower than the width of the openings so that an image of high resolution and definition is produced at the exit side of the screen.

2. The radiographic screen of claim 1 wherein the layers are of silverplated copper micromesh and the layer covering the entrant side of the screen is aluminum.

3. The radiographic screen claimed in claim 1 wherein the micromesh screen is confined within a transparent container further containing a fluid phosphor which penetrates and fills the openings through the contiguously related opaque metal layers.

4. The radiographic screen of claim 1 wherein the width of the openings in successive sheets progressively decrease affording a cone shape to the channels.

5. A radiographic screen for use with gamma and X-rays of energy levels greater than 1 mev. comprising a plurality of superposed micromesh sheets of opaque metal of low secondary electron emission each having a multiplicity of closely arrayed uniformly sized openings through the thickness thereof which openings have a width less than .030 inch, the openings through each sheet being aligned with openings in the remaining sheets to constitute long and narrow channels extending axially of the screen and filled with transparent plastic containing phosphor material which emit photons when excited by gamma and X-rays greater than 1 mev., said channels being of a length greater than their width which retards those gamma and X-rays passing axially through the channels whereby the phosphor is caused to emit photons, a continuous layer of material covering the entrant end of said filled channels which transmits the gamma and X-rays and reflects the emitted photons, the walls of said channels being reflective to the emitted photons so that the emitted photons are directed to the exit end of the screen, and the webs between the channels being sufficiently smaller than the width of the openings such that the emitting photons produce a composite image of high resolution and definition when viewed at the exit side of the screen.

6. A radiographic screen comprising a plurality of superposed contiguously related opaque metal layers each having a multiplicity of closely arrayed uniformly arranged openings through the thickness thereof, which openings are of a uniform width greater than the thickness of the individual layers and less than .030 inch, the openings through said layers being aligned with openings in other of said layers to constitute long and narrow channels extending axially of the screen from front to rear and filled with material which emits photons when energized by gamma and X-rays of high energy level, the length of said channels being sufficiently longer than the width of said opening so as to retard those high energy level gamma and X-rays passing axially into said channels and cause said material therein to emit photons, the walls of said channels being reflective to said emitted photons whereby the emitted photons are directed to the exit ends of the channels.

7. A radiographic screen as claimed in claim 6 wherein the material with which the long and narrow channels are filled comprises liquid phosphor.

8. A radiographic screen as claimed in claim 6 wherein the material with which the long and narrow channels are filled comprises gaseous phosphor.

9. A radiographic device employing X-rays and gamma rays greater than 1 mev. comprising a source of radiation, a radiographic screen, means for collimating a narrow beam of radiations from said source to the radiographic screen, the screen comprising a plurality of closely arrayed, axially parallel isolated scintillators which are parallel to and in the path of said beam, said scintillators being of a length to retard said collimated radiations and containing a phosphor excited by said retarded radiations to emit photons, said scintillators having a width not exceeding .030 inch and enclosed by opaque metal webs of sufficiently narrow width that the openings comprise at least 70% of the total screen area, said web serving to prevent photon coupling between adjacent scintillators and direct the emitted photons to the rear end of the screen, the entrant end of the scintillators being covered by material transparent to said radiations and opaque to the emitted photons, and means adjacent the rear end of the radiographic screen by which the illuminated ends of the scintillators may be viewed.

10. A radiographic device employing X-rays and gamma rays greater than 1 mev. comprising a source of radiation, a radiographic screen, means for collimating a narrow beam of radiations from said source to the radiographic screen, the screen comprising a plurality of closely arrayed, axially parallel isolated scintillators separated by opaque metal webs comprising less than 30% of the total screen area, the width of the scintillators not exceeding .030 inch and their length being several times as great so as to retard said radiations and containing a phosphor excited by said retarded radiations to emit photons, said webs between said scintillators being highly reflective to said emitted photons so as to prevent photon coupling between adjacent scintillators and direct the emitted photons to the rear end of the screen, the entrant end of the screen being covered by material which is transparent to said radiations and opaque to the emitted photons whereby an image of high resolution and definition is produced by the illuminated ends of the scintillators, and scanning means transmitting the image formed thereby to a remotely located viewing station.

11. The radiographic device claimed in claim 10 wherein said scanning means comprises the image pickup tube of a televiewing system.

12. The radiographic device claimed in claim 10 wherein said scanning means comprises an angled mirror.

13. The radiographic device claimed in claim 10 wherein said scanning means includes a viewing screen optically connected to the illuminated ends of said scintillators by bundles of fiber optics.

References Cited
UNITED STATES PATENTS

| | | | |
|---|---|---|---|
| 1,532,782 | 4/1925 | Sheppard et al. | 250—80 |
| 2,827,571 | 4/1959 | Klasens et al. | 250—80 |
| 2,882,413 | 4/1959 | Vingerhoets | 250—80 |
| 2,983,835 | 5/1961 | Frey | 250—80 |
| 2,998,518 | 8/1961 | Guntert | 250—80 |
| 3,032,657 | 5/1962 | Meier et al. | 250—71 |
| 3,041,228 | 6/1962 | MacLeod | 250—80 |
| 3,089,956 | 5/1963 | Harper | 250—80 |

RALPH G. NILSON, *Primary Examiner.*

ARCHIE R. BORCHELT, *Examiner.*

A. L. BIRCH, *Assistant Examiner.*